United States Patent [19]
Knapp

[11] Patent Number: 5,540,324
[45] Date of Patent: Jul. 30, 1996

[54] JEWELRY PACKAGE

[75] Inventor: Robert L. Knapp, Akron, Ohio

[73] Assignee: Sterling Inc., Akron, Ohio

[21] Appl. No.: 526,173

[22] Filed: Sep. 11, 1995

Related U.S. Application Data

[63] Continuation of Ser. No. 136,007, Oct. 14, 1993, abandoned.

[51] Int. Cl.⁶ .................................................. A45C 11/04
[52] U.S. Cl. ........................... 206/6.1; 206/348; 206/461; 206/471; 206/470
[58] Field of Search ............................ 206/6.1, 19, 388, 206/348, 470, 471, 63.3, 461; 220/339

[56] References Cited

U.S. PATENT DOCUMENTS

| | | | |
|---|---|---|---|
| 850,408 | 4/1907 | Sullivan . | |
| 1,429,608 | 9/1922 | May . | |
| 1,526,122 | 12/1923 | Dau . | |
| 2,033,526 | 3/1936 | Kinkenon | 206/44 |
| 2,269,915 | 9/1940 | Porter | 229/87 |
| 2,535,229 | 3/1949 | Paolantonio | 206/78 |
| 2,651,850 | 9/1953 | Czerwiczaik | 206/19 |
| 2,827,161 | 3/1958 | Rosa | 206/19 |
| 2,861,680 | 11/1958 | Frasch | 206/56 |
| 4,016,972 | 4/1977 | Szamborski | 206/470 |
| 4,120,394 | 10/1978 | Soltes | 206/19 |
| 4,880,717 | 11/1989 | Garganese | 206/487 |
| 5,090,568 | 2/1992 | Tse | 206/470 |
| 5,121,835 | 6/1992 | Grupe | 206/471 |
| 5,219,071 | 6/1993 | Knapp | 206/6.1 |
| 5,293,993 | 3/1994 | Yates, Jr. et al. | 206/470 |

*Primary Examiner*—David T. Fidei
*Attorney, Agent, or Firm*—Reese Taylor

[57] ABSTRACT

A reusable package for transporting articles such as jewelry chains and necklaces and the like includes a base and a complementary, similarly configured cover hingedly connected thereto. The base includes a base plate having a channel-like recess for receiving the jewelry chains, and the cover includes a cover plate having a ring-like projection configured similar and complementary to the base plate so as to encase the jewelry chain therein. The package also includes a pendant securing depression on its cover for receiving a pendant attached to the jewelry chain which releasably engages a pendant securing projection on the base to encase the pendant therein. Engagement means for releasably interconnecting the cover and the base may include a snap projection on the base which may be forcibly engaged to a snap depression on the cover to securely close the package.

8 Claims, 2 Drawing Sheets

JEWELRY PACKAGE

This application is a file wrapper continuation of U.S. patent application Ser. No. 08/136,007, filed Oct. 14, 1993, now abandoned.

BACKGROUND OF THE INVENTION

This invention relates in general to packages. More particularly, this invention relates to a unique, reusable and environmentally friendly package for the transportation of articles of jewelry, such as chains, necklaces or the like.

DESCRIPTION OF THE PRIOR ART

Packages for transporting jewelry such as chains, necklaces and the like are well known in the art. Many of these packages are also designed for use and display in the retail market and are therefore aesthetically designed for such use. Accordingly, they do not necessarily protect the jewelry well.

For example, Knapp U.S. Pat. No. 5,219,071 discloses a jewelry package which includes a ribbon or similar means for securing a chain or necklace within the package and also serves to constitute a decorative outer securing means for the package itself. Like most packages of the prior art, this package generally includes flaps which fold over a base to cover the jewelry. These flaps, however, do not prevent the jewelry from sliding and moving within the jewelry package. Only the ribbon or securing means binds the jewelry to the base. Accordingly, the jewelry may be damaged during transportation unless the package is handled very carefully, especially where pendants are included with the chains.

Moreover, such packages are typically provided to the consumers upon purchase of the jewelry. They are generally not used to transport the jewelry to the jewelry store or to return jewelry to the warehouse.

In addition, many packages only provide for chains or necklaces of one length. However, transportation and other return costs could be reduced if more than one chain or necklace could be transported in the same package or if chains of differing lengths could be placed in a particular package thereby reducing the need to carry varying sizes in inventory.

Accordingly then, it is thought desirable to provide a reusable, environmentally friendly package for at least one article of jewelry or the like which adequately protects the article or articles from possible damage during transportation.

SUMMARY OF INVENTION

It accordingly is a principal object of this invention to provide a reusable, environmentally friendly package for articles such as jewelry and the like which effectively protects the articles.

It is also an object of this invention to provide such a package for articles of jewelry and the like, as above, which can protect more than one chain or necklace at one time and which can protect chains or necklaces of differing lengths.

In furtherance of these objects, it has been found that the package itself may include a base and a cover complementary to and configured similar to the base. The cover may have at least one recess therein for receipt of at least one article such as a jewelry chain or the like. The base may have at least one mating pedestal similarly configured and complementary to the recess of the cover such that the mating pedestal may be at least partially contained the recess in the cover, thereby completely encasing the jewelry chain in the package when the package is closed.

It has also been found that the cover and base of the package can be securely interconnected by a means of engagement when the package is closed so as to retain any chains encased therein during transportation and prevent them from accidentally falling out of the package. Such engagement means may include a projection on the base which may be forcibly engaged with a depression on the cover.

It has further been found that the package may include indicia on at least one planar surface of the cover in order to provide a suitable means to communicate information about the article therein.

Accordingly, production of an improved jewelry package of the type above described becomes the principal object of this invention with further objects thereof becoming more apparent upon a reading of the following brief specification considered and interpreted in view of the accompanying drawings.

PREFERRED EMBODIMENT FOR CARRYING OUT THE INVENTION

Figure 1:
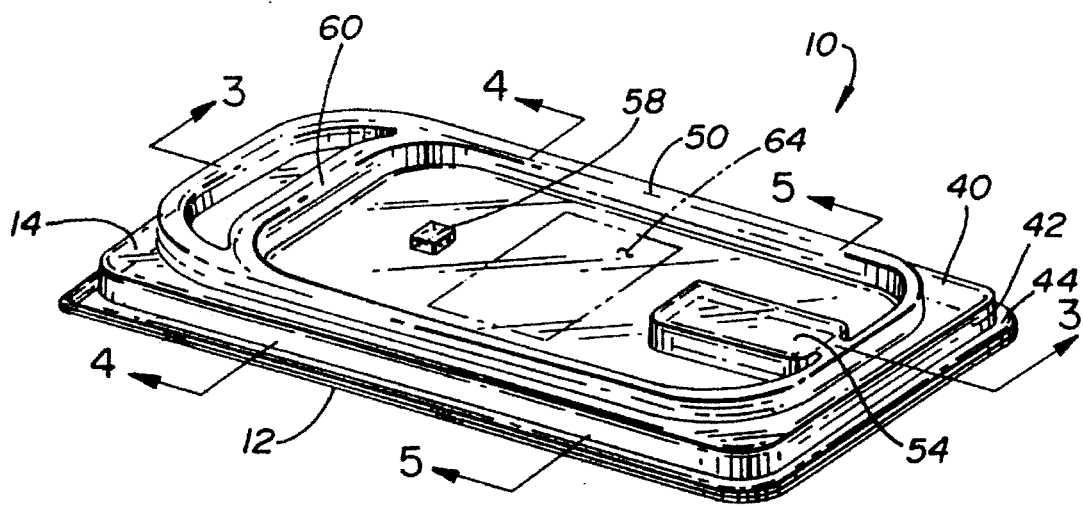
FIG. 1 is a perspective view of the package in its closed position.
Figure 2:
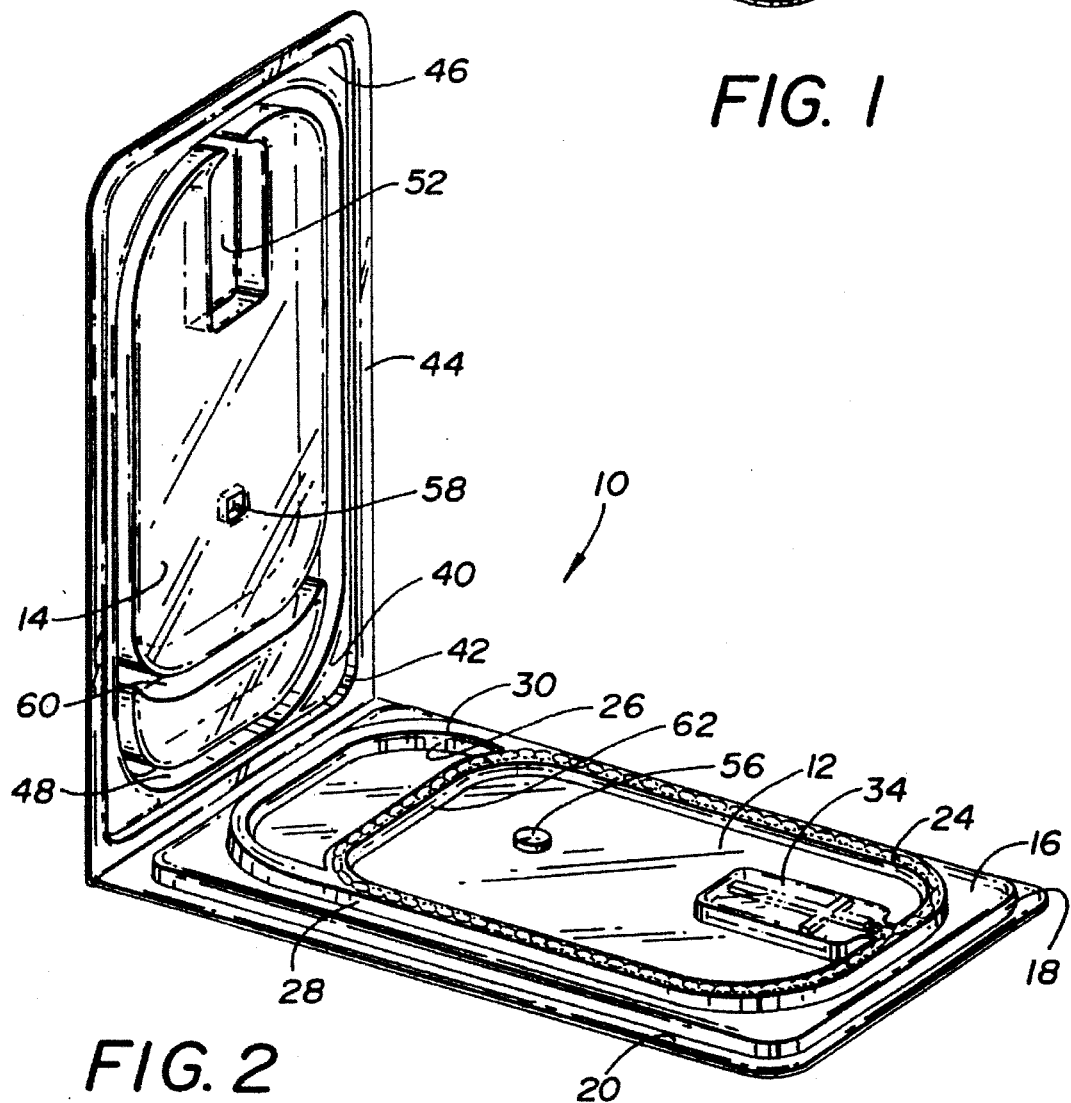
FIG. 2 is a perspective view of the package in its open position.

A package embodying the concepts of the present invention is indicated generally by the numeral 10 in FIGS. 1 and 2 of the accompanying drawings and generally includes a base 12 and a complementary, similarly configured cover 14. Base 12 and cover 14 are both preferably generally rectangular in shape although any shape known in the art suitable for the purposes described herein may be employed and fall within the scope of the invention.

The base 12 and cover 14 are preferably hingedly connected as along one edge thereof, but should not necessarily be limited to that type of connecting engagement, it being understood that base 12 and cover 14 may be separate from one another or otherwise connected in some other manner known in the art.

Base 12 and cover 14 are preferably made of a clear, sturdy yet flexible, plastic material capable of protecting any article encased therein. However, it should be understood that any material capable of adequately protecting the article or articles therein is sufficient, and therefore, the present invention should not be limited to clear and/or plastic materials although such materials do make it possible to visually inspect the contents.

Figure 3:
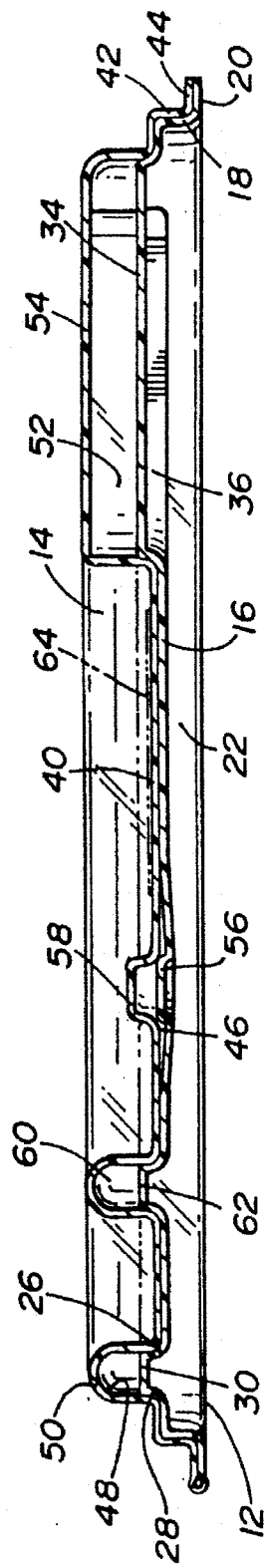
FIG. 3 is a sectional view taken along the line 3—3 of FIG. 1.
Figure 4:
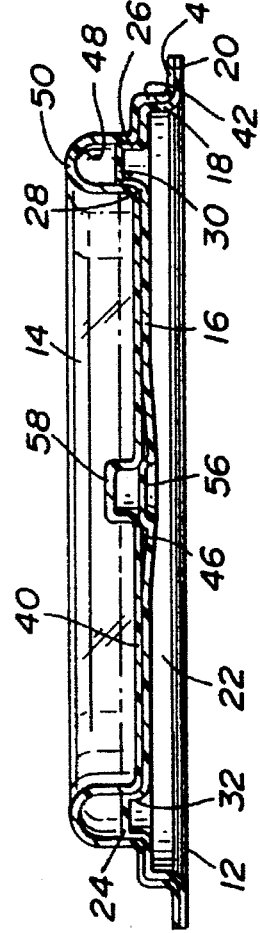
FIG. 4 is a sectional view taken along the line 4—4 of FIG. 1.
Figure 5:
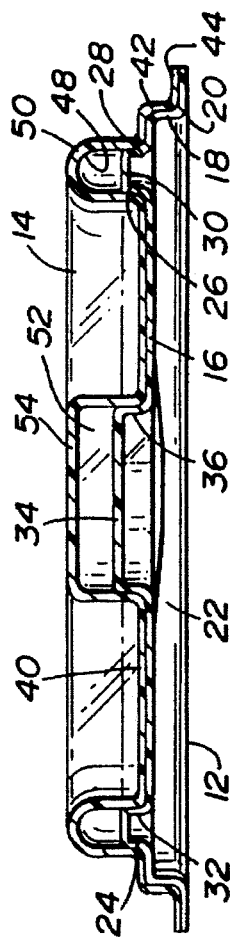
FIG. 5 is a sectional view taken along the line 5—5 of FIG. 1.

As best seen in FIG. 2, base 12 includes a generally planar base plate 16 which terminates at its perimeter with a shoulder 18 communicating between base plate 16 and an outwardly directed flange 20 at the periphery of base 12. In the preferred embodiment, shoulder 18 raises plate 16 above flange 20 such that shoulder 18 extends upwardly from flange 20 inwardly of the periphery of base 12. Accordingly, as can be seen in FIGS. 3 through 5, an air space 22 defined by shoulder 18 is created below base plate 16.

Projecting upwardly from plate 16 in the direction of cover 14 is at least one ring-like pedestal 24 which generally communicates with a similarly configured, channel-like recess in cover 14 as will be subsequently described. Pedestal 24 generally has an upwardly extending inner side wall 26 and a generally opposed, upwardly extending outer side wall 28 disposed radially outward of inner side wall 26, both of which terminate at a raised, preferably planar surface 30. As can be seen in of the preferred embodiment, pedestal 24 may be integrally formed with and a part of base plate 16, the pedestal 24 being disposed inwardly of the perimeter thereof and extending therearound. As such, pedestal 24 may define a channel-like recess 32 in the base plate.

Furthermore, a projection 34 located radially inward of ring-like pedestal 24 and extending upwardly from base plate 16 toward cover 14 in a similar manner as pedestal 24 may also be included as part of base 12. In fact, as shown in the preferred embodiment, projection 34 is integrally formed with and made a part of pedestal 24. Such a projection 34 is utilized to help encase and secure any pendants or other ornaments which may be attached to the chain or other article to be secured in package 10 and communicates with a similarly configured, complementary depression in cover 14 as will be subsequently described. Projection 34 may also define a recess 36 in base plate 16 similar to recess 32.

With reference to FIGS. 1 and 2, cover 14 includes a generally planar cover plate 40 which terminates adjacent its perimeter with a shoulder 42 substantially similar to shoulder 18 of base 12. Shoulder 42 communicates between cover plate 40 and an outwardly directed flange 44 at the periphery of cover 14. Preferably, shoulder 42 raises cover plate 40 above flange 44 in a similar manner as shoulder 18 raises base plate 16 above flange 20, thereby creating a base-receiving chamber 46 defined by shoulder 44 under cover plate 40. That is, as best seen in FIGS. 3 through 5, when package 10 is closed, base-receiving chamber 46 receives base 12 such that cover plate 40, shoulder 42 and flange 44 lie adjacent to and contact base plate 16, shoulder 18 and flange 20, respectively, with shoulder 42 acting as an engagement means with complementary shoulder 18 to keep base 12 and cover 14 securely together as may be required.

Cover plate 40 also includes at least one channel-like recess 48 for receiving at least one article such as a jewelry chain. Notably, inasmuch as recess 48 is typically deeper than the thickness of cover plate 40, an arcuate ring-like projection 50 on cover plate 40 and defining recess 48 extends upwardly above cover plate 40 away from base 12.

As noted hereinabove, channel-like recess 48 is complementary to and similarly configured to ring-like pedestal 24 of base 12 and therefore is preferably disposed on cover plate 40 near the perimeter thereof and extends therearound. However, as can be seen in FIGS. 3 through 5, projection 50 defining recess 48 provides for a recess in cover 14 which is deeper than the distance pedestal 24 projects from base 12. Consequently, when recess 48 receives pedestal 24 and mates therewith upon closing cover 14 to base 12, there is still adequate space in recess 48 for encasing at least one chain or necklace.

Furthermore, a depression 52, defined by a projecting compartment 54 located radially inward of and communicating with ring-like projection 50, may be formed in cover plate 40 and communicates with recess 48 for receiving a pendant or other ornament which may be attached to at least one chain received in recess 48. In the preferred embodiment, such a depression 42 is similarly configured to and is capable of receivably engaging projection 34 on base plate 16 to encase and secure the pendant or other ornament within depression 52.

Notwithstanding the engagement of base 12 and cover 14 by shoulder 18 and 42, respectively, package 10 further may include engagement means carried by base 12 and cover 14 for releasably interconnecting the base 12 with cover 14. More particularly, as shown best in FIGS. 2–4, base 12 includes a preferably circular snap projection 56 extending upwardly from base plate 16 toward cover 14 while cover 14 includes a preferably square snap depression 58 for receiving the snap projection 56. Because of the configuration of projection 56 and depression 58, it will be appreciated that, in order to securely fasten base 12 to cover 14, projection 56 must be forced into depression 58 Conversely, in order to open package 10, projection 56 must be forced out of depression 58.

In addition, package 10 may also provide for receiving jewelry chains of differing lengths. This is accomplished by a second channel-like recess 60 in cover 14 and a complementary, similarly configured second pedestal 62 on base 12. More specifically, second recess 60 essentially extends transversely of the long sides of rectangular ring-like recess 48 so as to present a shorter ring-like recess in cover 14. Similarly, second pedestal 62 extends transversely of the long sides of rectangular ring-like pedestal 24. Accordingly, recess 60 and pedestal 62 are integrally a part of recess 48 and pedestal 24, respectively, and essentially provide a alternative path for jewelry chains to follow In operation then, it will be understood that package 10 is effective in carrying and protecting an article such as a jewelry chain or the like from damage during transportation or otherwise. To open package 10, the user preferably grabs flange 20 of base 12 with one hand at the edge of package 10 opposite the edge where base 12 and cover 14 are hingedly connected and grabs flange 44 of cover 14 with the other hand and pulls base 12 and cover 14 apart. In many instances, snap projection 56 and depression 58 will then separate with a snap sound.

Once package 10 is open, the article to be encased and protected therein, such as a jewelry chain, may be inserted into recess 48 or recess 60 as appropriate, depending upon the length of the chain. Base 12 is then folded over or otherwise closed upon cover 14 such that base plate 16 is received by chamber 46 as described hereinabove with recesses 48 and 60 receiving pedestals 24 and 62, respectively, to encase the jewelry chain therein. Snap projection 56 may then be forcibly interconnected to snap depression 58 by pressing projection 56 into depression 58.

Cover 14 may also include a surface 64 upon which indicia may be placed to provide a suitable means to communicate information about the article therein. Preferably, such a surface 64 is presented on cover plate 40 generally radially centrally of the ring-like projection 50 which defines recess 48.

Based upon the foregoing disclosure, it should now be apparent that the use of the package described herein will carry out the objects set forth hereinabove. While a full and complete description of the invention has been set forth in accordance with the dictates of the Patent Statutes, it should be understood that modifications can be resorted to without departing from the spirit hereof or the scope of the appended claims.

For example, as noted hereinabove, the package of the present invention is preferably made from a clear plastic material so as to permit the user thereof to see the type of article encased in the package. However, it should be understood that any suitable protective material known in the art which is sturdy, yet flexible, enough for the purpose for which it is intended could be employed.

Furthermore, it should be understood that, while jewelry has been referred to herein, and while the invention has great utility in the jewelry field, the package could be used to retain any article small enough and similarly configured to effectively lie in a package of this nature.

What is claimed is:

1. A package for the transportation of small articles comprising:
   a) a base;
   b) a cover having a planar configuration complementary to that of said base and having an outer perimeter;
   c) said cover having at least one elongated recess therein spaced inwardly from said outer perimeter and extending substantially parallely with said outer perimeter for receipt of at least one article;
   d) said base having at least one mating pedestal configured complementary to and at least partially received by said at least one elongated recess of said cover;
   e) engagement means carried by said base and said cover for releasably interconnecting said base and said cover;
   f) said cover including a cover plate having an article receiving depression formed therein; and
   g) said article receiving depression opens into said one elongated recess.

2. The package of claim 1 wherein said base includes a base plate having a projection formed thereon which is complementary to and is at least partially and releasably received by said article receiving depression.

3. The package of claim 1 wherein said base and said cover are hingedly connected along one edge thereof.

4. The package of claim 2 wherein said engagement means are carried on said base plate and said cover plate.

5. The package of claim 4 wherein said engagement means include a snap projection on said base plate; and a complementary snap depression on said cover plate.

6. The package of claim 1 wherein said engagement means include a shoulder projecting from said base disposed inwardly of its periphery; and a complementary peripheral shoulder in said cover disposed inwardly of its periphery and defining a chamber for at least partially receiving said shoulder of said base.

7. The package of claim 6 wherein said cover has a second article receiving recess; and said second recess opens into said one elongated recess and extends transversely of opposed sides of said first elongated recess.

8. The package of claim 1 wherein said cover includes a first, indicia receiving surface; said one article receiving recess extending around said first, indicia receiving surface.

* * * * *